(12) United States Patent
Ludwig et al.

(10) Patent No.: US 11,223,570 B2
(45) Date of Patent: Jan. 11, 2022

(54) METHODS AND NETWORK NODES FOR CONTROLLING RESOURCES OF A SERVICE SESSION AS WELL AS CORRESPONDING SYSTEM AND COMPUTER PROGRAM

(75) Inventors: Reiner Ludwig, Hürtgenwald (DE); Fabian Castro Castro, Madrid (ES); Susana Fernandez Alonso, Madrid (ES); Pablo Molinero Fernandez, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1044 days.

(21) Appl. No.: 14/346,766

(22) PCT Filed: Sep. 29, 2011

(86) PCT No.: PCT/EP2011/066990
§ 371 (c)(1),
(2), (4) Date: May 7, 2014

(87) PCT Pub. No.: WO2013/044959
PCT Pub. Date: Apr. 4, 2013

(65) Prior Publication Data
US 2014/0317300 A1 Oct. 23, 2014

(51) Int. Cl.
*H04L 12/911* (2013.01)
*H04L 12/26* (2006.01)
(Continued)

(52) U.S. Cl.
CPC .......... *H04L 47/70* (2013.01); *H04L 41/5022* (2013.01); *H04L 41/5054* (2013.01);
(Continued)

(58) Field of Classification Search
CPC .......... H04W 76/064; H04W 28/0268; H04W 28/26; H04W 76/022; H04W 76/041;
(Continued)

(56) References Cited

U.S. PATENT DOCUMENTS 5,711,010 A * 1/1998 Naddell ................ H04W 84/08
455/509
7,330,425 B1 * 2/2008 Gulati ..................... H04L 45/02
370/217

(Continued)

FOREIGN PATENT DOCUMENTS

| WO | 2007072232 A2 | 6/2007 | |
|---|---|---|---|
| WO | WO-2010072239 A1 * | 7/2010 | ........... H04W 48/16 |
| WO | 2010086687 A1 | 8/2010 | |

OTHER PUBLICATIONS

3GPP TS 23.203, V11.2.0 (Jun. 2011), 3rd Generation Partnership Project, Technical Specification Group Services and System Aspects, Policy and charging control architecture, (Release 11), Jun. 2011, ftp://ftp.3gpp.org/specs/2011-06/Rel-11/23_series/.*

(Continued)

*Primary Examiner* — Hitesh Patel
*Assistant Examiner* — Clifton Houston
(74) *Attorney, Agent, or Firm* — Murphy, Bilak & Homiller, PLLC

(57) ABSTRACT

The present invention relates to a methods and network nodes for controlling resources of a service session in a communication network as well as to a corresponding system and computer program to improve the handling of resources in the network, and particularly to optimize signaling in the network. The method for controlling resources for a service session by a policy and charging system in a communication network comprises the steps of obtaining, at a first network node, a request including service session data indicating the type of service; determining, based on the service session data obtained at said first network node, a resource type to be assigned to said service; and sending to a second network node an indication of said resource type assigned to said service, according to which resource type it (Continued)

is determined when a service session associated with said service is terminated.

16 Claims, 6 Drawing Sheets

(51) Int. Cl.
| | |
|---|---|
| *G06F 15/16* | (2006.01) |
| *H04L 29/06* | (2006.01) |
| *H04L 12/24* | (2006.01) |
| *H04M 15/00* | (2006.01) |
| *H04W 76/34* | (2018.01) |
| *H04W 28/02* | (2009.01) |
| *H04L 29/08* | (2006.01) |
| *H04W 28/26* | (2009.01) |
| *H04W 76/12* | (2018.01) |
| *H04W 76/38* | (2018.01) |
| *H04W 76/22* | (2018.01) |

(52) U.S. Cl.
CPC .......... *H04L 65/4069* (2013.01); *H04L 65/80* (2013.01); *H04M 15/66* (2013.01); *H04W 76/34* (2018.02); *H04L 67/145* (2013.01); *H04W 28/0268* (2013.01); *H04W 28/26* (2013.01); *H04W 76/12* (2018.02); *H04W 76/22* (2018.02); *H04W 76/38* (2018.02)

(58) Field of Classification Search
CPC .. H04W 76/068; H04L 65/4069; H04L 65/80; H04L 47/70; H04L 41/5022; H04L 41/5054; H04L 67/145; H04L 12/5695; H04L 65/1016; H04L 65/105; H04L 65/1006; H04L 12/14; H04M 15/66
See application file for complete search history.

(56) References Cited

U.S. PATENT DOCUMENTS

| | | | | | |
|---|---|---|---|---|---|
| 2005/0108570 | A1* | 5/2005 | Gopalraj | ............... | H04L 63/108 726/4 |
| 2007/0036167 | A1* | 2/2007 | Hu | ......................... | H04L 67/14 370/410 |
| 2007/0259673 | A1* | 11/2007 | Willars | ................. | H04L 67/141 455/453 |
| 2010/0062781 | A1* | 3/2010 | Dolganow | ............ | H04W 76/27 455/450 |
| 2010/0182955 | A1* | 7/2010 | Bjork | ...................... | H04L 67/16 370/328 |
| 2010/0217270 | A1* | 8/2010 | Polinski | ................ | A61F 2/0095 606/87 |
| 2010/0217877 | A1* | 8/2010 | Willars | ................... | H04W 4/24 709/228 |
| 2011/0225280 | A1* | 9/2011 | Delsesto | ................. | H04W 4/24 709/223 |
| 2011/0228733 | A1* | 9/2011 | Koo | ...................... | H04W 72/04 370/329 |
| 2011/0255460 | A1* | 10/2011 | Lohmar | ................ | H04W 48/16 370/312 |
| 2011/0296032 | A1* | 12/2011 | Pastor Balbas | ......... | H04L 47/70 709/227 |
| 2012/0250601 | A1* | 10/2012 | Choi | ..................... | H04W 88/04 370/315 |
| 2012/0275300 | A1* | 11/2012 | Munoz de la Torre Alonso | ......... | H04L 67/16 370/229 |

OTHER PUBLICATIONS

3GPP TS 23.203, V11.2.0 (Jun. 2011), 3rd Generation Partnership Project, Technical Specification Group Services and System Aspects, Policy and charging control architecture, (Release 11), Jun. 2011, ftp://ftp.3gpp.org/specs/2011-06/Rel-11/23_series/ (Year: 2011).*

3GPP, "3rd Generation Partnership Project; Technical Specification Group Core Network and Terminals; Policy and Charging Control over Gx/Sd reference point (Release 11)", 3GPP TS 29.212 V11.1.0, Jun. 2011, 1-152.

3GPP, "3rd Generation Partnership Project; Technical Specification Group Core Network and Terminals; Policy and Charging Control over Rx reference point (Release 11)", 3GPP TS 29.214 V11.1.0, Jun. 2011, 1-51.

3GPP, "3rd Generation Partnership Project; Technical Specification Group Services and System Aspects; Policy and charging control architecture (Release 11)", 3GPP TS 23.203 V11.2.0, Jun. 2011, 1-142.

* cited by examiner

METHODS AND NETWORK NODES FOR CONTROLLING RESOURCES OF A SERVICE SESSION AS WELL AS CORRESPONDING SYSTEM AND COMPUTER PROGRAM

TECHNICAL FIELD

The present invention relates to a methods and network nodes for controlling resources of a service session in a communication network as well as to a corresponding system and computer program, and in particular to a method for controlling resources of a service session carried out by a network node including a policy and charging rules function and a method for controlling resources of a service session carried out by a network node including an application function or traffic detection function as well as corresponding network nodes.

BACKGROUND

In communication networks, such as telecommunication networks, a call or a service often involves, on the one hand, a control plane or signalling plane and, on the other hand, a user plane or media plane. The control plane or signalling plane is in charge of establishing and managing a connection between two points of the network. The user plane or media plane is in charge of transporting user data or service data.

Network operators have the desire to define and enforce a set of rules in the network. A set of rules constitutes policies. A policy framework for managing and enforcing these policies usually includes at least three elements or functions: a policy repository for storing policy rules, which may be user-specific, a policy decision element or function and a policy enforcement element or function. The purpose of a policy framework includes controlling subscriber access to networks and services as well as the kind of access, i.e. its characteristics.

A policy framework notably addresses the decisions as to whether the subscriber is entitled, or authorized, to enjoy a service, and whether the network can provide the service to the subscriber, and particularly whether the network can provide the service to the subscriber with the desired Quality of Service (QoS).

Policy and charging control architectures, such as, but not limited to, the architecture described in 3GPP TS 23.203 version 11.1.0 (2011-03), Technical Specification Group Services and System Aspects; Policy and charging control architecture (release 11) (available on http://www.3gpp.org/ftp/Specs/2011-03/Rel-11/23_series/), integrate policy and charging control.

One aim of a policy framework is to set up and enforce rules dependent on subscribers and/or desired services to ensure efficient usage of network resources among all subscribers.

An architecture that supports Policy and Charging Control (FCC) functionality is depicted in FIG. 1 which is taken from 3GPP TS 23.203 specifying the FCC functionality for Evolved 3GPP Packet Switched domain including both 3GPP accesses and Non-3GPP accesses. The Policy and Charging Rules Function (PCRF) 110 is a functional element that encompasses policy control decision and flow based charging control functionalities. The PCRF provides network control regarding Service Data Flow (SDF) detection, gating, QoS and flow based charging (except credit management) towards the Policy and Charging Enforcement Function (PCEF) 120. The PCRF receives session and media related information from the Application Function (AF) 140 and informs the AF of traffic plane events. The PCRF 110 is also coupled to a Subscriber Profile Repository (SPR) 150.

The PCRF shall provision PCC Rules to the PCEF via the Gx reference point and may provision QoS Rules to the Bearer Binding and Event Reporting Function (BBERF) 130 via the Gxx reference point (for deployments based on PMIP/DSMIP protocol in the core network).

In the architecture 100 of FIG. 1, the PCRF shall inform the PCEF through the use of PCC Rules on the treatment of each service data flow that is under FCC control, in accordance with the PCRF policy decision(s).

The Gx reference point is defined in 3GPP TS 29.212 "Policy and charging control over Gx reference point", and lies between the PCRF and the PCEF. The Gx reference point is used for provisioning and removal of PCC Rules from the PCRF to the PCEF and the transmission of traffic plane events from the PCEF to the PCRF. The Gx reference point can be used for charging control, policy control or both.

The Rx reference point is defined in 3GPP TS 29.214 "Policy and charging control over Rx reference point" and is used to exchange application level session information between the PCRF and the AF. An example of PCRF is the Ericsson Service-Aware Policy Controller (SAPC), see for example F. Castro et al., "SAPC: Ericsson's Convergent Policy Controller", Ericsson review No. 1, 2010, pp. 4-9. An example of an AF is the IP Multi-Media Subsystem (IMS) Proxy Call Session Control Function (P-CSCF). The Sd reference point in FIG. 1 may have a similar behaviour to the Rx reference point, which is seen in the following in which the AF and TDF, at least for the purpose described in this application, can be used basically interchangeably.

Both Gx and Rx reference points may be based on Diameter, see for example P. Calhoun et al., "RFC 3588: Diameter Based Protocol", IETF, September 2003.

The PCEF enforces policy decisions received from the PCRF and also provides the PCRF with user-and access-specific information over the Gx reference point. The node including the PCEF or another Bearer Binding Function encompasses SDF detection based on filter definitions included in the PCC Rules, as well as online and offline charging interactions (not described here) and policy enforcement. Since the PCEF is usually the one handling bearers, it is where the QoS is being enforced for the bearer according to the QoS information coming from the PCRF. This functional entity, i.e. the PCEF, is located at the Gateway, e.g. in the Gateway GPRS Support Node (GGSN), in the GPRS case. For all the cases where there is Proxy Mobile IP (PMIP) or Dual-Stack Mobile IP (DSMIP) in the core network, the bearer control is performed in the BBERF instead.

The Application Function (AF) 140 is an element offering applications in which service is delivered in a different layer, e.g. transport layer, from the one the service has been requested, e.g. signalling layer. The control of resources, such as, but not limited to, IP bearer resources, is performed according to what has been negotiated. One example of a network node including an AF 140 is the P-CSCF (Proxy-Call Session Control Function) of the IP Multi-Media (IM) Core Network (CN) subsystem. The AF 140 may communicate with the PCRF 110 to transfer dynamic session information, i.e. description of multi-media to be delivered in the transport layer. This communication is performed using the above-described Rx interface or Rx reference point, which is placed between the PCRF 110 and the AF 140 and is used to exchange application level information between the PCRF 110 and the AF 140. Information in the Rx interface may be derived from the session information or service session information in the P-CSCF and it mainly includes what is called media components. A media component is composed by a set of IP flows, each one described through a 5-tuple, the media type and bandwidth required, for example. Another example of a network node including an AF 140 is a streaming server.

The AF may interact or intervene with applications that require dynamic policy and charging control. It extracts service session information and provides this to the PCRF over the Rx reference point. The AF also can subscribe to certain events that occur at the traffic plane, i.e. events detected by either the PCRF or BBERF. Those traffic plane events include events such as IP session termination or access technology-type change.

Upon reception of the PCC/QoS rules from the PCRF, a Bearer Binding Function (BBF), either the PCEF or the BBERF depending on the deployment scenario, performs the bearer binding, i.e. associates the provided rule to an IP-CAN bearer within an IP-CAN (Internet Protocol Connectivity Access Network) session. The BBF will use the QoS parameters provided by the PCRF to create the bearer binding for the rule. The binding is created between service data flow(s) included in the PCC/QoS rule and the IP-CAN bearer which have the same QoS Class Identifier (QCI) and Allocation Retention Priority (ARP).

The BBF will then evaluate whether it is possible to use one of the existing IP-CAN bearers or not. If none of the existing bearers can be used, the BBF should initiate the establishment of a suitable IP-CAN bearer. Otherwise, if required, e.g. QoS information has changed, the BBF will initiate the modification of the corresponding bearer. For GBR bearers, i.e. bearers with guaranteed bit rate, the BBF will reserve the required resources based on the QoS information provided by the PCRF.

If the QCI and ARP of the PCC/QoS rule match the QCI and ARP of the default bearer, the BBF will install those rules in the default bearer. When the PCRF requests the removal of previously provided PCC/QoS rules, the BBF will delete them and modify the bearers accordingly. When all the PCC/QoS rules applied to one bearer have been deleted and/or deactivated, the BBF will start the bearer termination procedure.

3GPP networks can support two different modes for the bearer establishment: UE-initiated or UE-network (UE_NW) bearer establishment modes. In GPRS, in the first one, the UE always initiates this procedure and, in the second one both the UE and the network can initiate the establishment of the bearer. In Evolved Packet Systems (EPS), it is considered that both the UE and the PCEF may request any resource establishment, modification or termination by adding, modifying or removing traffic flow information which may be contained in a PCC Rule. The bearer is always established by the network.

During the PDN connection establishment both the UE and the network (SGSN in a GPRS network) indicate their bearer establishment mode capabilities. When the PCRF is contacted, it selects the bearer establishment mode based on those capabilities. The bearer control mode provided by the PCRF will be propagated to the network and UE so that the next interactions work accordingly.

On the other hand, there are terminals that do not support dedicated bearers. Those terminals will declare to the network that they support UE-initiated bearer establishment mode, and a default bearer can be established or modified by the UE. In the same way, there are network deployments that do not support dedicated bearer establishment initiated by the UE. In these deployments, when the BBF indicates the PCRF that the network request is not supported, the PCRF will assume that only the default bearer will be established. All PCC/QoS rules will be installed in that bearer, i.e. the QCI and ARP assigned to those PCC/QoS rules will correspond to the QCI and ARP of the default bearer.

The Traffic Detection Function (TDF) 160 is a functional entity that performs application detection and reporting of detected application or service and its service data flow description to the PCRF. The TDF can act in solicited mode, i.e. upon request from the PCRF, or unsolicited mode, i.e. without any request from the PCRF.

Next, PCC support to applications is described. When an application requires dynamic policy and/or charging control over the IP-CAN user plane to start a service session, the AF will communicate with the PCRF to transfer the dynamic session information required for the PCRF to take the appropriate actions on the IP-CAN network. The PCRF will authorize the session information, create the corresponding PCC/QoS rules and install them in the PCEF/BBERF. The PCEF/BBERF will encompass SDF detection, policy enforcement (gate and QoS enforcement) and flow based charging functionalities. As described, the applicable bearer will be initiated/modified and if required, resources will be reserved for that application.

Once the application or the user equipment (UE) decides to terminate that service, the AF will communicate the PCRF so that the PCRF can remove the applicable PCC/QoS rule(s) and the PCEF/BBERF stops the corresponding SDF detection, policy enforcement and flow based charging functionalities, terminating or updating the applicable bearer, and releasing the corresponding resources.

The AF can subscribe to specific actions in order to be informed about certain events in the IP-CAN network. In this case, the PCRF will contact the AF when those conditions apply, e.g. release of a bearer. An application server including the AF, such as a streaming server, may request establishment of a bearer from the PCRF according to its requirements, i.e. video or other streaming services require specific bandwidths, QoS, charging, etc. The AF may set a timer to request to disconnect the bearer after a certain time period.

Next, PCC support for service awareness functionality is described. 3GPP release 11 has introduced a new entity in the FCC architecture, namely the TDF, that is a Deep Packet Inspection (DPI) box that monitors the payload and detects when an application is initiated/terminated. This functionality can also reside in the PCEF.

The TDF can perform solicited and unsolicited application reporting. For the solicited case, the PCRF instructs the TDF on which applications to detect and report to the PCRF by activating the appropriate ADC (Application and Detection Control) rules, thus instructing the TDF to notify the PCRF, if necessary. The PCRF may instruct the TDF (or PCEF) what enforcement actions to apply for the detected application traffic.

For the unsolicited case, the TDF is pre-configured on which applications to detect and report. The enforcement is performed in the PCEF. The unsolicited mode is not supported in the PCEF.

The unsolicited mode can be implemented by using the Rx reference point (but also the Gx reference point). In that case, the TDF will act as an AF that will communicate with the PCRF when the application is detected. In the same way, the TDF will communicate with the PCERF when the traffic for that application is finished.

According to current procedures, the AF establishes an AF session to allow the use of a service according to certain QoS and charging demands. In the same way, the AF terminates the AF session when those demands are not needed anymore. The AF can modify the session information during the lifetime of the AF session, e.g. a service session.

The AF is unaware of the network deployment, UE capabilities and the QoS that the network operator assigned for that service at the IP-CAN level. The AF has usually no knowledge about the kind of bearers selected for that service.

Based on this lack of knowledge, the AF has to act in a "protective mode", i.e. it will always contact the PCRF whenever the application conditions change, and the PCRF is mandated to initiate the PCC/QoS rules provision/removal procedures accordingly, with the initiation of the corresponding bearer procedure in the BBF.

There are applications that may require resource reservation and the corresponding resource removal with a high frequency. This can be the case for Internet services where the user has periods of inactivity and renewal of the activity while browsing in the web. In this case, the AF, or similarly the TDF as defined in 3GPP, will contact the PCRF when it deduces that the service is not being used anymore, e.g. after a configurable inactivity timer expires, and when it deduces that the service is being used again, e.g. when a new packet for this service is detected. This would mean high signaling in the network for the initiation of the applicable bearer procedures.

On the other hand, based on the network conditions, there is no benefit in the user perception in removing and re-establishing bearers based on the application demands and on the contrary there could be high signaling in the network, if the current procedures are applied.

It is thus desirable to provide methods, network nodes, a system and a computer program to improve the handling of resources in the network, and particularly to optimize signaling in the network.

SUMMARY

Such methods, network nodes, system and computer program are defined in the independent claims. Advantageous embodiments are defined in the dependent claims.

In one embodiment, a method for controlling resources of a service session by a policy and charging system in a communication network is provided, which may be carried out by a first network node, e.g. a node including a Policy and Charging Rules Function (PCRF). The method comprises obtaining at the first network node, a request including service session data indicating the type of service; determining, based on the service session data obtained at the first network node, a resource type to be assigned to the service; and sending to a second network node an indication of the resource type assigned to the service, according to which resource type it is determined when a service session associated with the service is terminated. Accordingly, the first network node can inform the second network node about the resource type so that signaling procedures in the network can be optimized and the amount of signaling in the network can be reduced, since both network nodes are aware of the resource type.

In one embodiment, a method for controlling resources of a service session in a communication network is provided, which may be carried out by a second network node, e.g. a node including a traffic detection function or application function. The method comprises sending, from the second network node, a request including service session data indicating the type of service to a first network node; receiving from the first network node an indication of a resource type determined based on the service session data and assigned to the service; and deciding when to terminate a service session associated with the service based on the received resource type. Accordingly, signaling procedures in the network between the two nodes can be optimized and the amount of signaling can be lowered.

In one embodiment, a network node is provided for controlling resources of a service session in a communication network. The network node comprises a request obtainer configured to obtain a request including service session data indicating the type of service; a determiner configured to determine, based on the obtained service session data, a resource type to be assigned to the service; and a resource type sender configured to send to a second network node an indication of the resource type assigned to the service, according to which resource type it is determined when a service session associated with the service is terminated. Accordingly, signaling procedures in the network can be optimized.

In one embodiment, a different network node is provided for controlling resources of a service session in the communication network. The network node comprises a request sender configured to send a request including service session data indicating the type of service to another network node; and a resource type receiver configured to receive from the other network node an indication of a resource type determined based on the service session data and assigned to the service. Further, a decider is provided in the network node configured to decide when to terminate a service session associated with the service based on the received resource type. Accordingly, signaling procedures in the network can be optimized.

In another embodiment, a system for controlling resources of a service session is provided. The system comprises the above described elements of the two network nodes, namely a request obtainer, a determiner, a resource type sender, a request sender, a resource type receiver and a decider.

In another embodiment, a computer program is provided which includes instructions configured, when executed on a data processor, to cause the data processor to execute one of the above described methods.

Further, advantageous embodiments of the invention are disclosed in the dependent claims.

DESCRIPTION OF THE EMBODIMENTS

Further embodiments of the invention are described with reference to the figures. It is noted that the following description contains examples only and should not be construed as limiting the invention.

In the following, similar or same reference signs indicate similar or same elements or operations.

Figure 2:
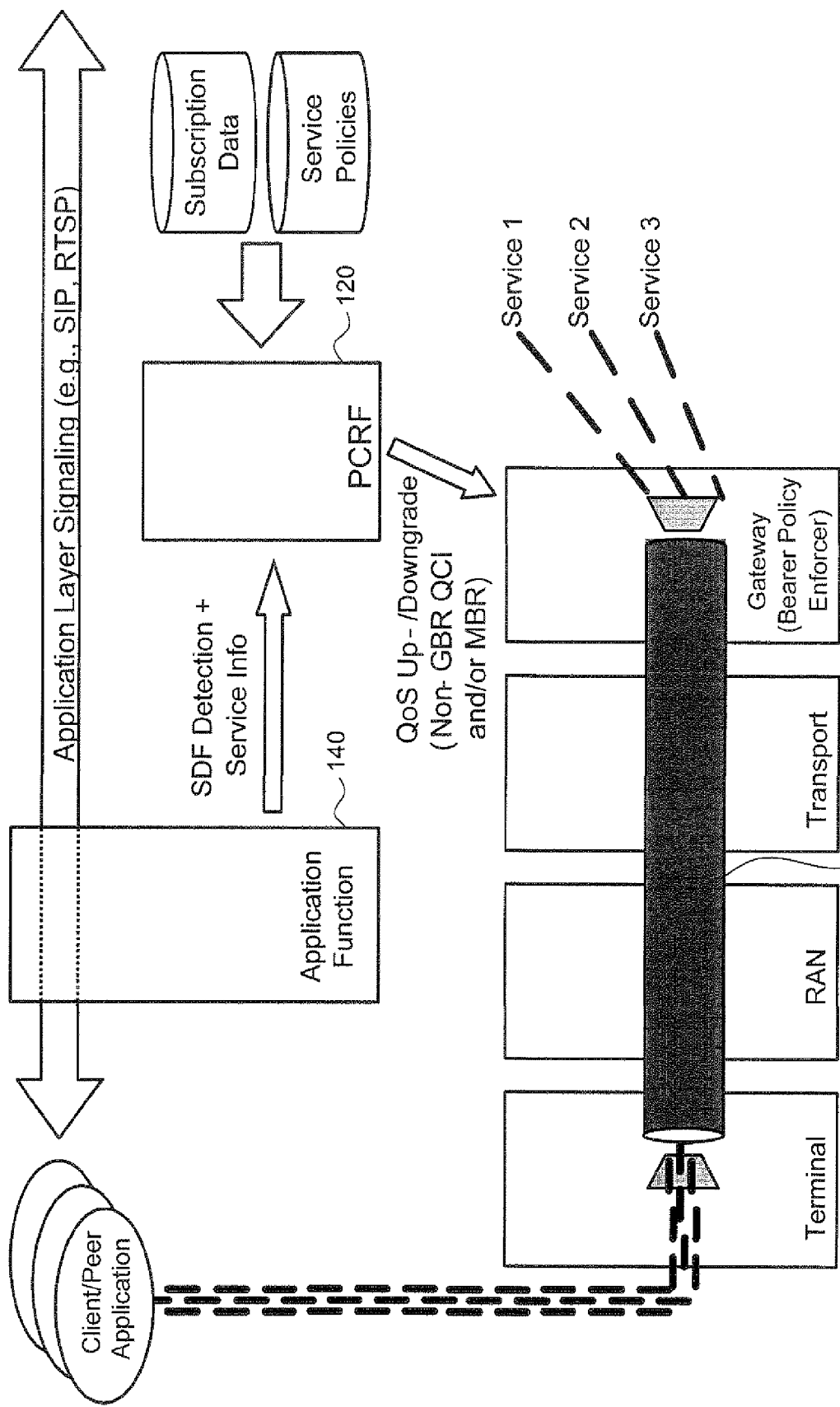
FIG. 2 illustrates a specific scenario to better explain embodiments of the invention.
Figure 3:
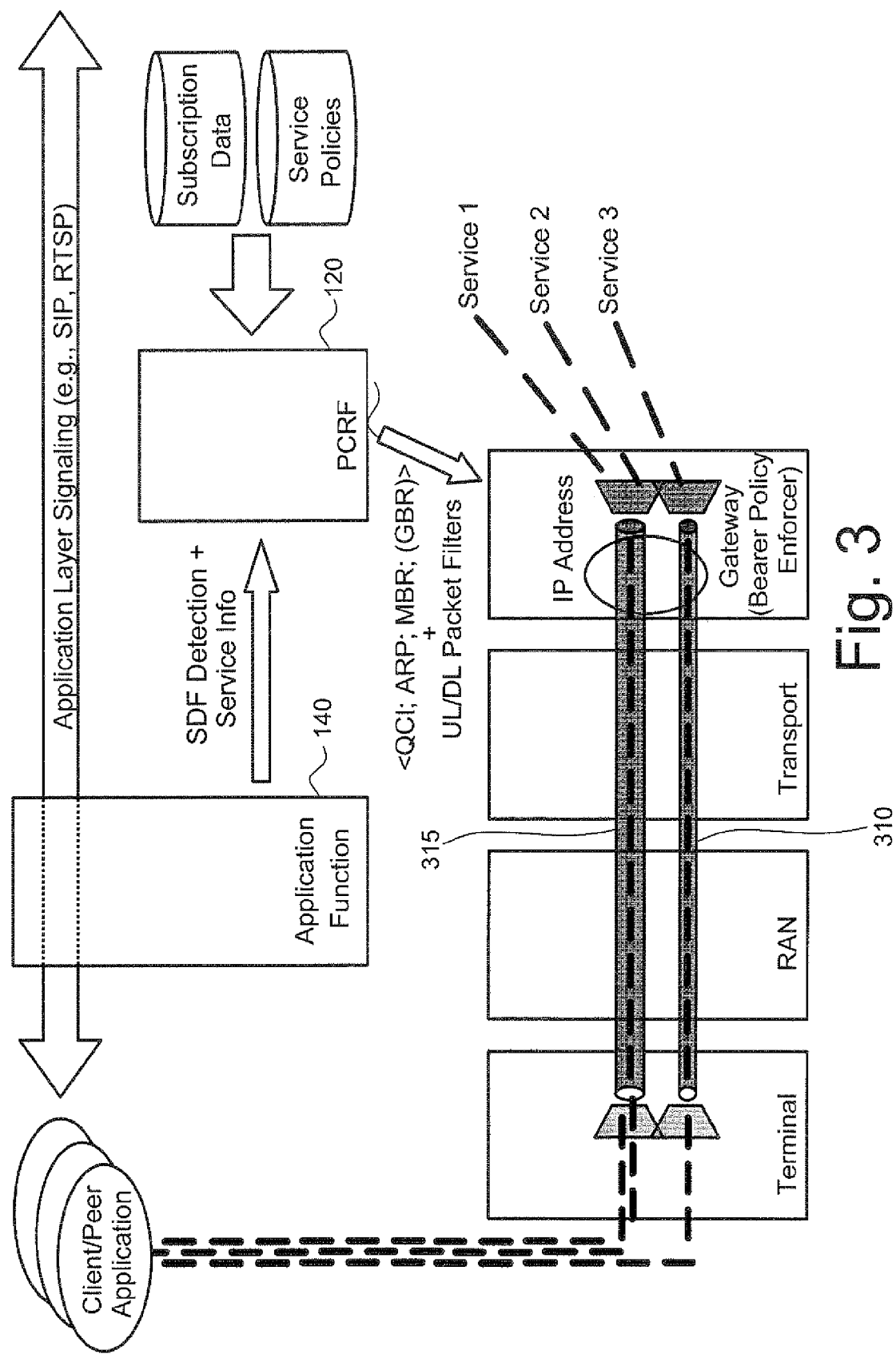
FIG. 3 illustrates another specific scenario to better explain embodiments of the invention.
Figure 4:
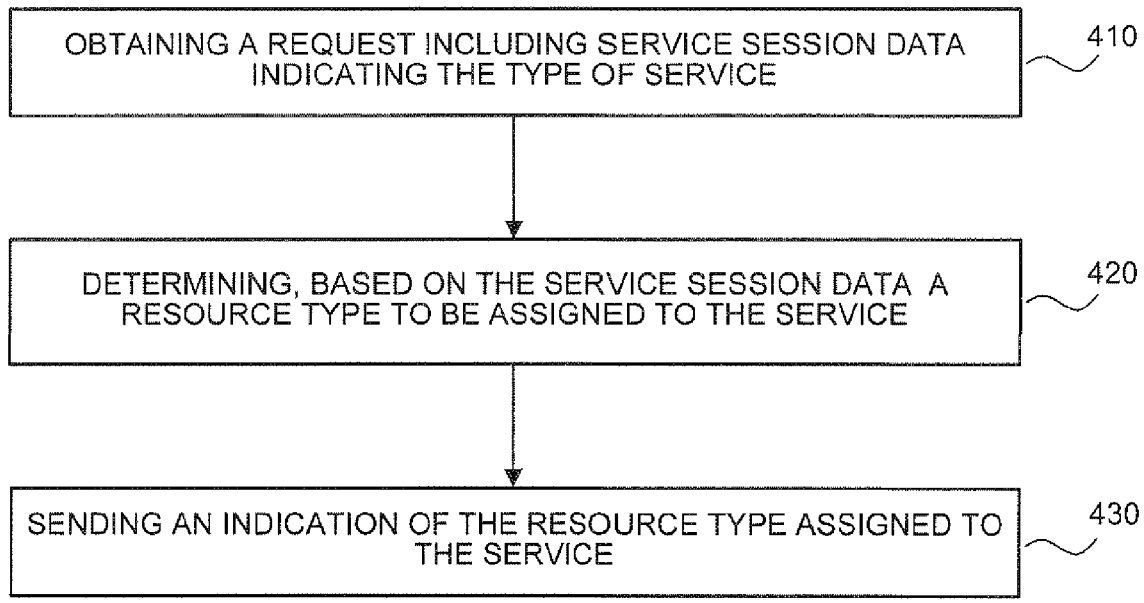
FIG. 4 illustrates operations of a method for controlling resources of a service session to be carried out by a first network node according to an embodiment.
Figure 5:
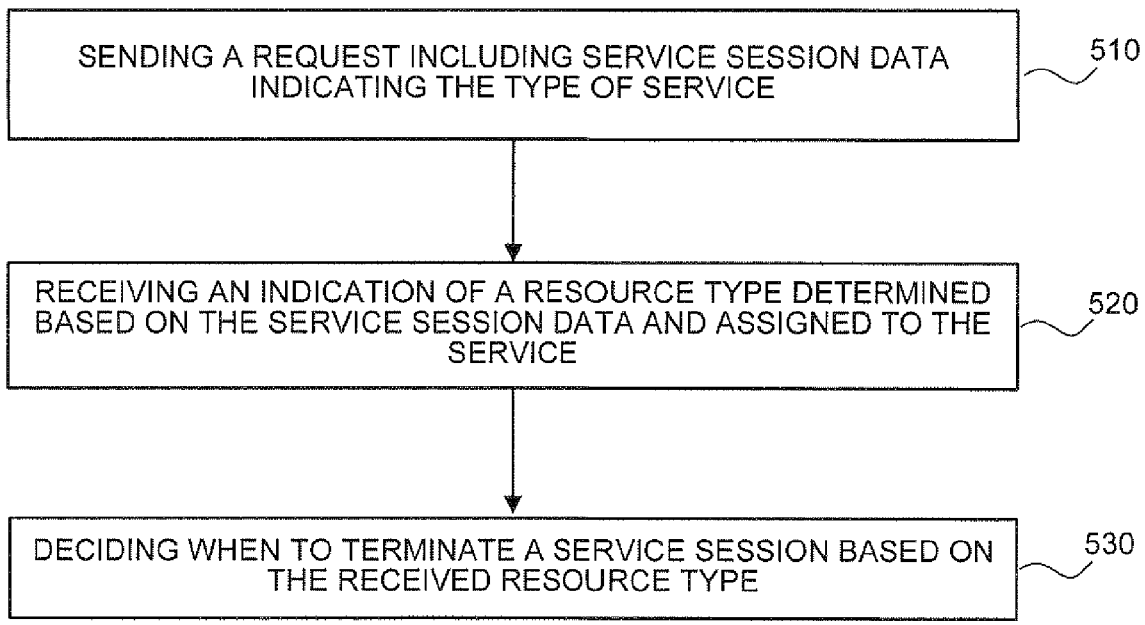
FIG. 5 illustrates operations of a method for controlling resources of a service session to be carried out by a second network node according to an embodiment.

Before describing the flowcharts of FIGS. 4 and 5 which illustrate methods for controlling resources of a service session carried out by a first and a second network node, respectively, some scenarios depicted in FIGS. 2 and 3, which are not optimized for the conventional procedures for specific applications, are discussed.

FIG. 2 illustrates a scenario in which dedicated bearers are not supported by the UE and/or network and thus the QCI for the derived PCC/QoS rules corresponds to the default bearer QCI, i.e. non-GBR QCI. As shown in FIG. 2, three different services use the same default bearer 210 so that all service data, e.g. IP packets, experiences the same PCC/QoS rules generated by the PCRF 120 based on SDF detection and service information from AF 140 and provides those to the bearer policy enforcer, e.g. PCEF or other node with a BBF. According to the rules, QoS may be upgraded or downgraded for all three services. For example, service 1 may be represent Internet browsing, service 2 P2P file sharing and service 3 IMS-voice or MTV. The service data is then received by a terminal, such as a UE, and processed in a client/peer application running on the terminal.

In the illustrated case, there is no risk of blocking any transmission resources on the default bearer. However, the resources cannot be kept forever since there is a risk of opening the door to allow any kind of traffic on the default bearer to benefit of a bearer QoS increment applied by the PCRF upon reception of a service detection notification. For example, since all three services are carried by the same bearer they all experience the QoS, in particular the highest QoS, assigned to one of the services. Thus, there is no flexibility and limited bearer level control regarding the default (non-GBR) bearer.

In the scenario illustrated in FIG. 3, dedicated bearers are supported by the UE and the network. For example, the classification of an IP packet to an SDF determines which bearer should be used to transfer the IP packet.

The QCI for the derived PCC/QoS rules corresponds to a non-GBR QCI, for example for web browsing services, such as the internet (service 1) carried by bearer 315 in FIG. 3. In this case, once the resources are reserved, there is no benefit on deleting and re-establishing (or modifying) the applicable bearer(s) regardless of whether the application detects that the service is being used or not. That is, a guaranteed bit rate (GBR) is not assigned and if there is a shortage in bandwidth, the bit rate through this bearer will decrease. The resources in this scenario do not block any transmission resources so there is no QoS limitation if the bearers are maintained during the lifetime of the PDN connection. In particular, if the bearers are maintained signaling to establish/terminate the bearers between the PCRF and the PCEF or signaling between the PCRF and the AF or TDF is reduced. In other words, a proliferation of bearers may not be that problematic as long as they do not reserve a bit rate.

Further, if the QCI for the derived PCC/QoS rules corresponds to a GBR QCI, for example for streaming services which require uninterrupted data transmission, such as in IMS voice (service 3 of FIG. 3). This is shown for bearer 310 in FIG. 3. In this case, there is a need to perform admission control and optimize the network resources based on the application requirements. The resources will have to be reserved and released based on the requests from the application. According to the above, in FIG. 3, there is the possibility for full bearer level control.

Without making the above described distinction, the network entities could be involved in unnecessary traffic that might affect the performance and consume network resources in an ineffective way.

Based on this distinction to effectively use network resources, the PCRF can indicate the AF or TDF the resource type assigned to a service, which is discussed in more detail with respect to FIGS. 4 and 5.

FIG. 4 illustrates a flowchart of a method for controlling resources of a service session. The illustrated operations or steps may be carried by a network node including a Policy and Charging Rules Function (PCRF), such as node 110 in FIG. 1. This node may be a server including or implementing the PCRF which is a functional element.

According to the method shown in FIG. 4, in step 410, a request including service session data indicating the type of a service from a second network node is obtained at a first network node. For example, the second network node may be a node including an AF or TDF and the first network node may be a node including the PCRF. Examples of these nodes and their connections with each other are shown in the policy and charging system of FIG. 1. The request may be a request for resource reservation which may trigger bearer establishment, modification or deactivation after the creation of FCC Rules at the first network node and the provision of those to a node including a BBF.

The AF of FIG. 1 usually provides the PCRF with service session data, which is service session information, for the purpose of authorizing the IP flows, i.e. unidirectional flows of IP packets with the same source IP address and port number and the same destination IP address and port number and the same transport protocol, which will be discussed in more detail with respect to an Authorization Request (AAR) in FIG. 8. It is understood that any kind of message from the second to the first network node can be used to indicate the type of service and thus the scheme is not limited to a specific request.

The service session data further indicates the type of service, for example by a service ID or application ID obtained by the AF or TDF, and/or may be based on the subscription of the subscriber from the SPR. Different service IDs are provided for different services, such as the above described services 1-3.

In step 420, a resource type to be assigned to a service, such as one of services 1-3, is determined based on the service session data obtained at the first network node (PCRF). For example, the resource type indicates that resources are temporarily reserved for this service or the resource type indicates that resources are permanently reserved for this service or the resource type may indicate a value which corresponds to a default value.

The step 420 may further comprise determining whether the communication network or a user terminal (UE) or both support a dedicated bearer of a plurality of bearers, which is a bearer dedicated to said service. Moreover, the resource type may be based on network capabilities, which may be indicated by a bearer control mode representing bearer related capabilities of the UE and/or network associated with the service session, which is information that the PCRF stores for this PDN connection.

In step 430, an indication of the resource type is sent to the second network node. The indication may be provided in a request response message and may be represented by a specific value at a specific bit position in the message. According to the resource type, it can be determined, e.g. by the AF, TDF or PCRF, when a service session associated with the service is to be terminated and also which node has to perform an action to initiate termination. That is, as mentioned above, the resource type may indicate that resources are temporarily or permanently reserved so that bearer modification/deactivation may be initiated at different points in time and advantageously not as often as in conventional systems, in which the AF does not know the resources of its connection for its services and contacts the PCRF when it deduces that the service is not being used at the moment.

For example, when resources are temporarily reserved, a timer may be started after the AF or TDF (second network node) starts detecting no or only minimal service data (data below a certain threshold) and may inform the first network node (PCRF) of the lapse of the timer subsequently so that the PCRF may start initiating bearer modification or deactivation. For example, bearer modification is initiated by the PCRF to the BBF based on an indication from the AF (e.g. after timer expiration) so that a default bearer with an increased QoS due to a sponsored service may be downgraded again after the sponsored service stopped. An indication of the AF may be that the AF terminates the session or removes the related flows.

According to the above, it is possible to improve the handling of resources in the network, and particularly to optimize signaling in the network and reduce frequent establishment, modification or termination of bearers.

FIG. 5 illustrates a flow diagram of another method for controlling resources of a service session. The illustrated operations or steps may be carried out by a network node including an Application Function (AF), such as node 140 in FIG. 1 or a network node including a Traffic Detection Function (TDF), such as node 160 in FIG. 1. This node, here referred to as second network node, may be a server including or implementing the AF or TDF which is a functional element.

According to the method shown in FIG. 5, in step 510 requests including service session data indicating the type of service is sent from the second network node to the first network node. For example, the request is sent from the AF to the PCRF or from the TDF to the PCRF. As mentioned above, the request may be a request for resource reservation which may trigger bearer establishment, modification or deactivation after the creation of one or more FCC Rules at the first network node and subsequent provision of the rules to a node including a BBF. Examples of the type of service and service session data have been described above and it is referred to the above discussion for details.

In step 520 an indication of a resource type is received from the first network node at the second network node, wherein the resource type is determined based on the service session data and assigned to the service in step 420 described previously with respect to the method carried out by the first network node shown in FIG. 4.

Subsequently, in step 530, it can be decided by the second network node when to terminate the service session associated with the service based on the received resource type. As explained above and as will be explained in more detail below, the resource type may indicate that resources are temporarily reserved so that after the duration of the reservation (e.g. expiration of timer), the second network node, such as AF, terminates the session or removes the related flows. For example, based on the lack of service data, the first network node, such as the PCRF, can receive an indication that resources, such as bearers, can be released.

Therefore, it is possible for the first and second network nodes to control the resource reservation based on the application requirements (current procedures) using the resource type information or the reservation is performed based on an IP-CAN decision, which can be a permanent or temporary (timer-controlled) reservation, which will be discussed in more detail further below.

Figure 1:
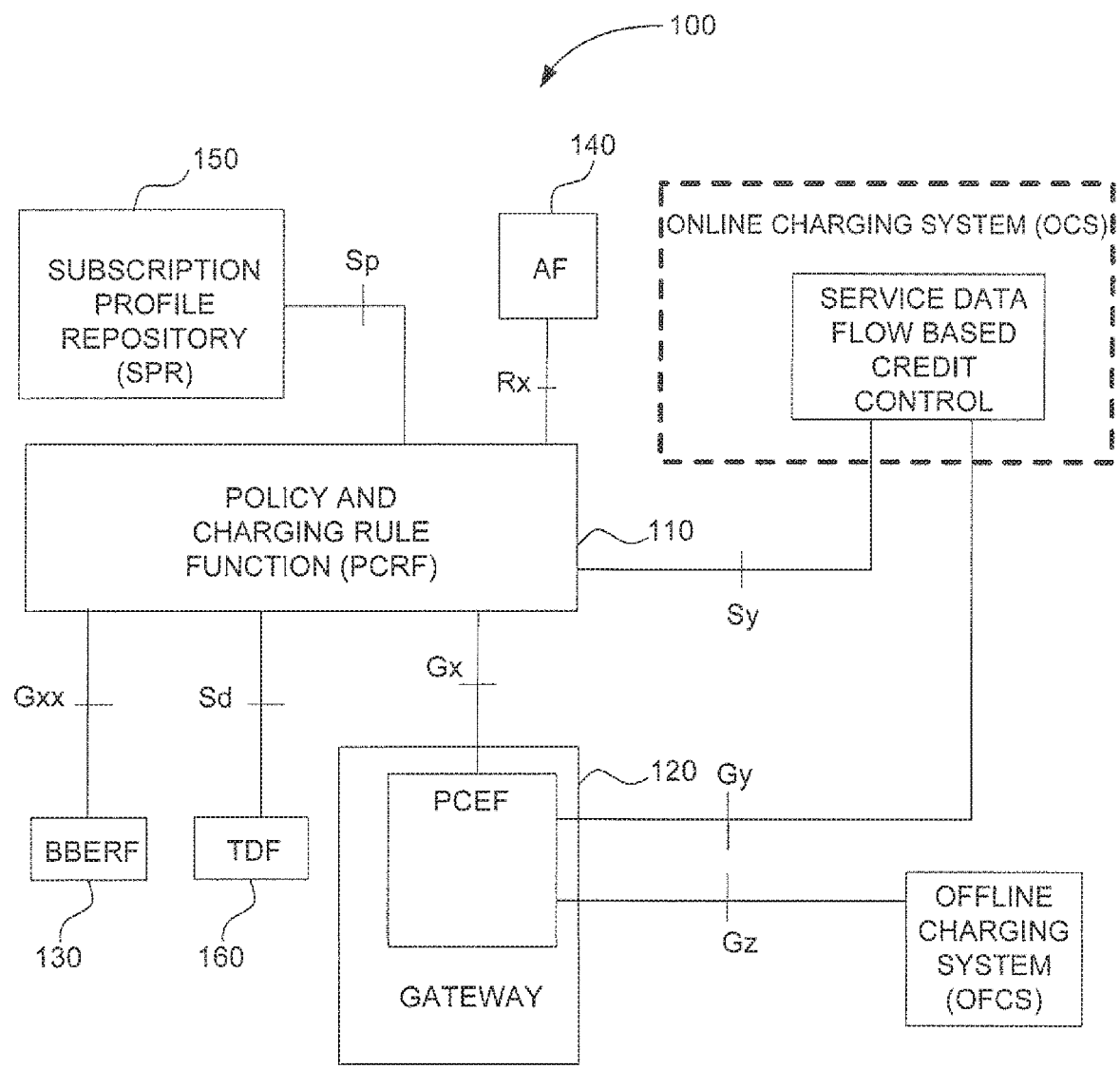
FIG. 1 illustrates an exemplary PCC architecture to assist the reader in understanding an exemplary content, in which embodiments of the invention may be applied.

In the above example, steps 410, 420 and 430 relate to a method carried out by the PCRF and steps 510, 520 and 530 relate to a method carried out by the AF or TDF and thus a method combining all steps 410-430 and 510-530 is carried out in the communication network, and in particular in the policy and charging system shown in FIG. 1. However, steps 410, 420 and 430 and steps 510, 520 and 530 are not limited to be carried out by the above mentioned two specific nodes but steps 410, 420 and 430, or similarly steps 510, 520 and 530, may also be carried out by more than one node, for example.

In the example below the second network node will be considered a node including the AF and the first network node a node including the PCRF for illustrated purposes, but the second network node could also be a node including a TDF and the schemes are not limited to a specific node or node combination.

During the establishment of a service session, here an AF session, the PCRF may send an indication to the AF about the resource type assigned to the service. Then, the AF may act as described in the following.

When the PCRF does not indicate any resource type or provides a default value, the AF acts according to previously known procedures, i.e. the services are kept according to application demands and it reserves and releases the resources based on the application logic, e.g. for IMS, it will establish and release the AF session as part of the SIP INVITE and SIP BYE procedures, respectively. In one example, an optimized PCRF would not indicate any resource type to the AF when the PCRF upon the AF request generates a dedicated GBR bearer.

When the PCRF indicates "resources permanently reserved", the AF will not contact the PCRF anymore for that service, and the AF will not take any action. The AF will be informed when the related bearer or the IP-CAN session is terminated. An optimized PCRF would indicate "resources permanently reserved" to the AF when the PCRF upon the AF request generates a non-GBR bearer.

When the PCRF indicates "resources temporarily reserved", the AF will not contact the PCRF until a timer related to that service expires. In other words, if the resource type indicates that resources are temporarily reserved, the AF (second network node) will activate a timer. In more detail, use of the service is monitored and when the service is stopped, the timer is activated, which timer may be provided by the PCRF which knows congestions in the network, for example, or may already be present at the AF and simply locally configured at the AF. In particular, the value related to that timer can be provided by the PCRF or locally configured in the AF. An optimized PCRF would indicate "resources temporarily reserved" to the AF when the PCRF upon the AF request generates a QoS upgrade in the default bearer.

The above indications and actions can be summarized in the following table.

Figure 6:
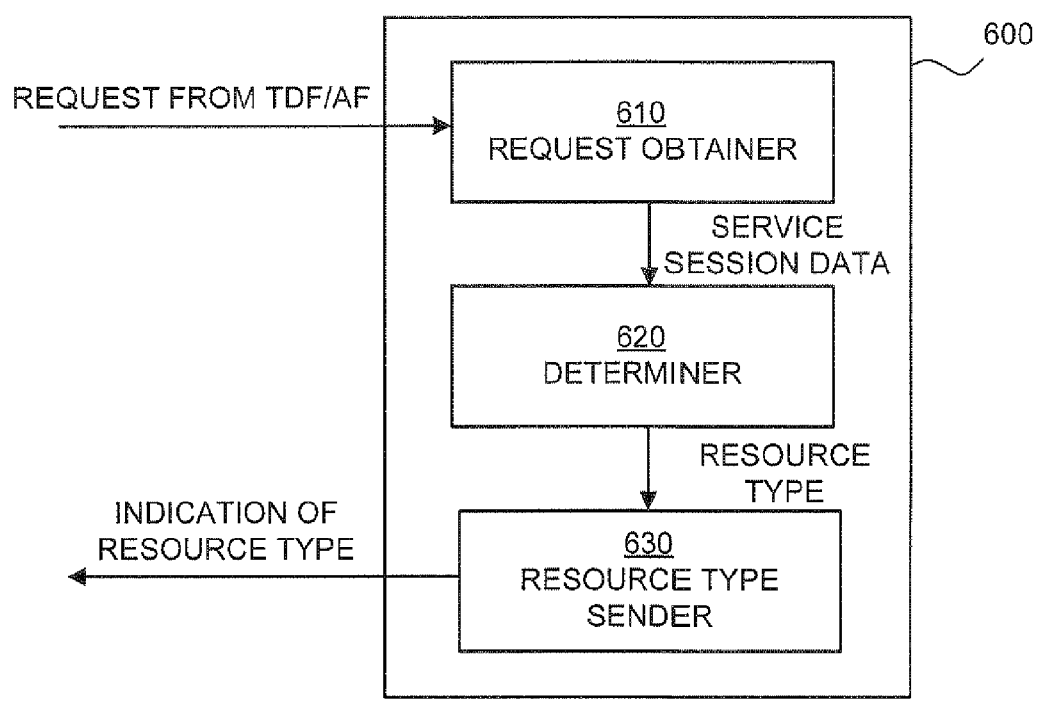
FIG. 6 illustrates elements of a first network node configured to control resources of a service session according to an embodiment.

As indicated in FIG. 6, this resource type is then forwarded from the determiner 620 to the resource type sender 630 which is configured to send to the second network node, an indication of the resource type assigned to the service, according to which resource type it is determined when a service session associated with the service is terminated.

| Allocated Resource type | PCRF indication to AF | AF Action | PCRF Action |
| --- | --- | --- | --- |
| Dedicated GBR bearer establishment | No indication | AF requires reservation or release of resources based on application logic. | Upon AF request the PCRF will release or reserve the resources in accordance. |
| Dedicated non-GBR bearer establishment | "Resources permanently reserved" | No further action needed | PCRF informs AF when related bearer or IP-CAN session is terminated |
| Default Bearer QoS modification | "Resources temporarily reserved" Optionally it can include a timer value to be initiated by the AF. | AF initiates a timer (timer value configured locally in the AF or value received in the PCRF notification). Upon timer expires the AF contacts the PCRF to indicate the service termination. | Upon AF notification of service termination the PCRF reestablishes the default bearer QoS to the original one. |

As can be seen from the table, the resource type may imply generation of a non-guaranteed bit rate bearer or guaranteed bit rate bearer.

If the resource type indicates that resources are permanently reserved, it should be understood that resources do not have to be reserved forever but also the AF may activate a timer which however is longer than the timer that is activated if the resource type indicates that resources are temporarily reserved. For example, when the PCRF indicates to the AF (or TDF) that the resources are permanently reserved, instead of doing nothing, the AF starts a timer that is much longer than the timer for temporarily reserved resources so that the effect in terms of network signaling at the Gx and Rx is similar for the case having a very long timer and the case without timer. After the timer expires, the AF will interact with the PCRF to release the resources. That is, a bearer might be terminated or a new FCC Rule is created in the PCRF and installed at the BBF which modifies the existing bearer.

As described above, the functions carried out by the AF can also be carried out by the TDF in the above examples, which performs packet inspection and service classification and thus obtains similar information about the service as known to the AF.

FIG. 6 illustrates elements of a network node 600 configured to control resources for a service session in a communication network according to the embodiment. The network node 600 may be configured to implement a PCRF and thus constitutes the above described first network node. As mentioned above, the network node 600 may be a server comprising a processor to carry out at least some of the above described functions, specifically the functions described with respect to FIG. 4. The network node 600 comprises a request obtainer 610, a determiner 620 and a resource type sender 630 which may be tangible elements or software functions running on a processor.

The request obtainer is configured to obtain from the second network node, a request including service session data indicating the type of service.

The determiner 620 receives the obtained service session data from the request obtainer 610 and is configured to determine, based on the service session data, a resource type to be assigned to the service.

Figure 7:
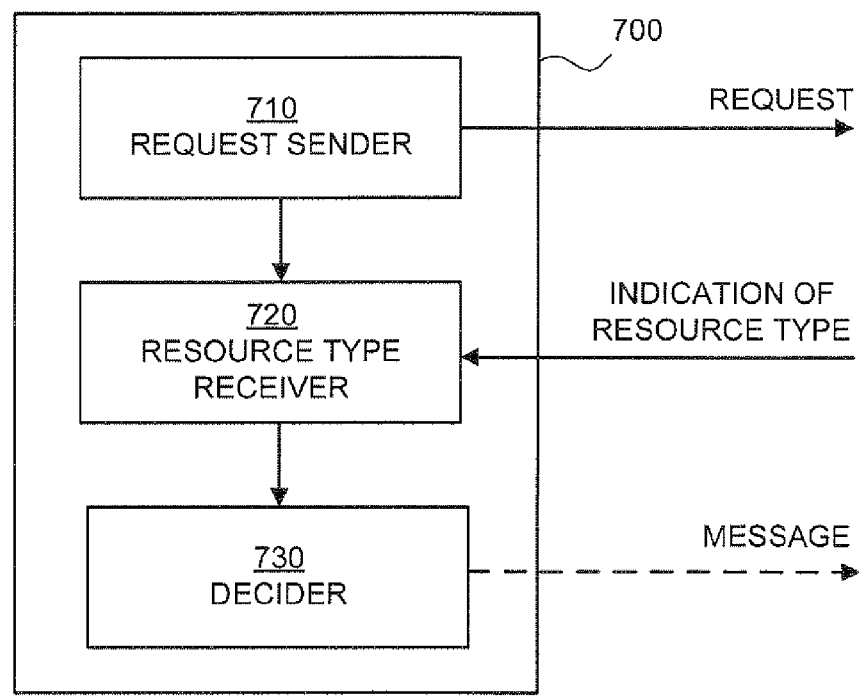
FIG. 7 illustrates elements of a second network node configured to control resources of a service session according to an embodiment.

FIG. 7 illustrates elements of a network node 700 for controlling resources of a service session in a communication network according to an embodiment. The network node 700 may implement an AF or TDF and thus may constitute the above described second network node. The network node 700 may be a server comprising a processor to carry out at least some of the above described functions, especially the functions described with respect to FIG. 5. In the same way, the network 700 may comprise a request sender 710, an indication receiver 720 and a decider 730 which may be tangible elements or software functions running on a processor.

The request sender 710 is configured to send a request including service session data indicating the type of service to another network node, such as the above described first network node.

The resource type receiver 720 is configured to receive from the other network node, i.e. the first network node, an indication of the resource type determined based on the service session data and assigned to the service as indicated by the arrow "indication of resource type" in FIG. 7.

The decider 730 is configured to decide when to terminate a service session associated with the service based on the received resource type. The decision of the decider 730 may then be forwarded as a message to the first network node, e.g. PCRF.

To avoid unnecessary repetition of the functions of the FIGS. 4 and 5, it is mentioned that these functions may also be carried out by the elements described with respect to FIGS. 6 and 7 and it is referred to the above explanation for more details about the network nodes 600 and 700.

A system for controlling resources of a service session may be simply the combination of the network nodes 600 and 700, wherein the signaling between the two nodes can already be taken from the arrows in FIGS. 6 and 7.

In the following, an exemplary method showing resource control using a resource type signaling is discussed with respect to FIG. 8.

Figure 8:
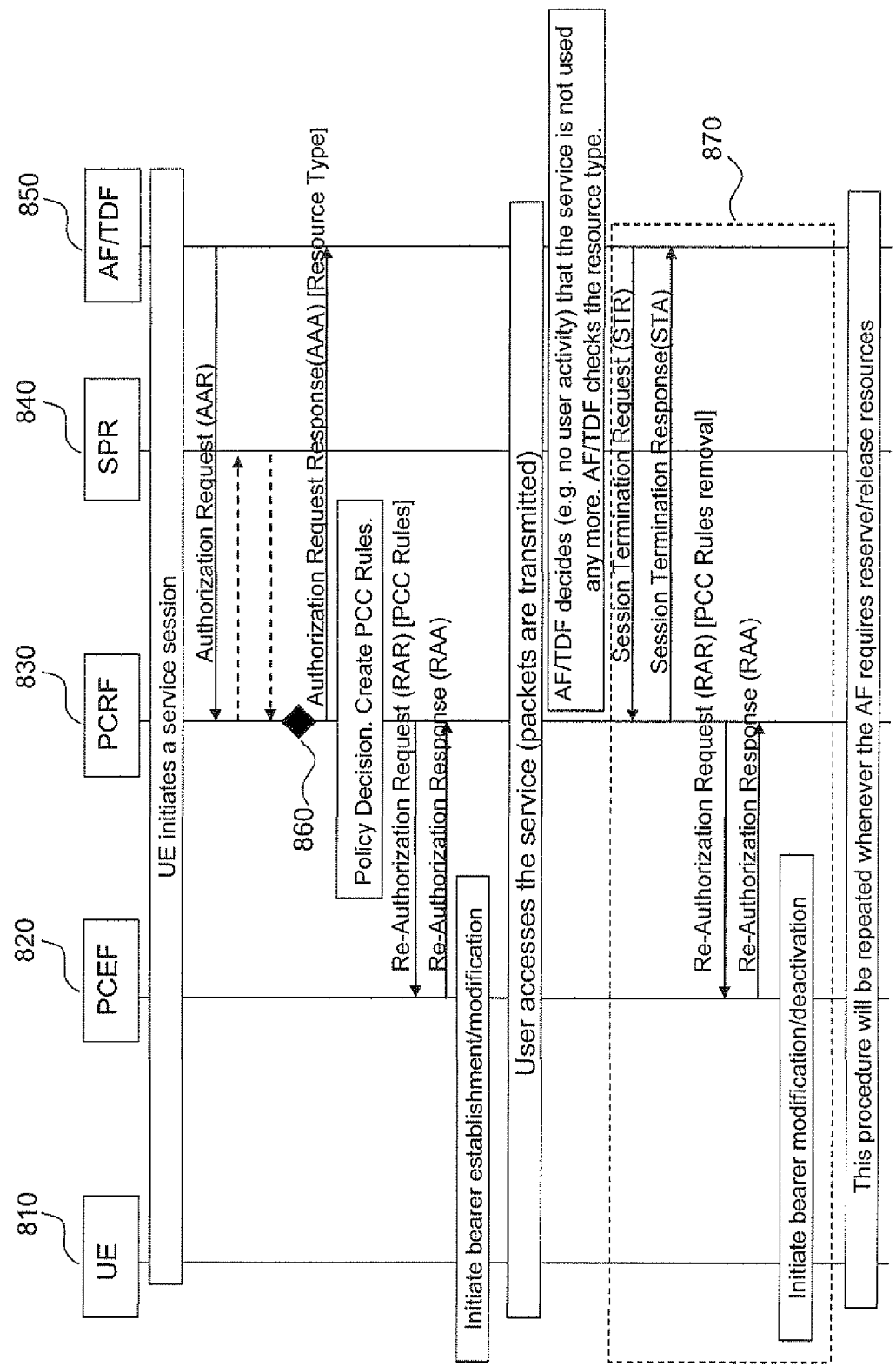
FIG. 8 illustrates an exemplary method according to an embodiment, showing resource control by resource type signaling.

The sequences depicted in FIG. 8 are carried out in a system comprising the first and second network nodes, such as PCRF 830 and AF/TDF 850 (previously described network nodes 600 and 700) as well as UE 810, PCEF 820, and SPR 840. The PCEF 820, PCRF 830 and SPR 840 as well as AF 850 or TDF 850 may be part of a PCC architecture, such as the one illustrated in FIG. 1. In this example, the BBF is included in the PCEF 820. According to the below described sequence resources can be controlled by resource type signaling.

As seen in FIG. 8, the UE initiates a service session. For example, the UE 810 negotiates with the AF 850 the service session conditions. The AF or TDF detects the new service establishment and contacts the PCRF for a resource reservation by sending a request. For example, the AF 850 provides the PCRF 830 with service session data for the purpose of authorizing the IP flows, i.e. unidirectional flows of IP packets with the same source IP address and port number and the same destination IP address and port number and the same transport protocol, see Authorization Request (AAR) in FIG. 8. The service session data includes an indication of the type of service. Optionally, the PCRF can also look for subscriber information in the SPR 840. It is also feasible that the PCRF already obtains the type of service when the UE 810 negotiates with the AF 850 the service session conditions.

Further, the PCRF checks whether the service is subject to resource type selection and if so selects the resource type required for the service. This can be done at the point indicated by 860 based on a combination of the bearer control mode, service ID (or application ID) and operator policies. The PCRF sends the selected resource type to the AF. For example, as shown in FIG. 8, the resource type can be provided to the AF with an Authorization Request Response (AAA). Additionally, a timer can be added to the message to the AF when the resource type indicates "resources temporarily reserved".

Then, the PCRF creates the PCC Rule(s) for that service and the PCRF installs the PCC Rule(s) in the BBF, in this example the PCEF. For example, the PCRF creates a PCC Rule and installs this PCC Rule in the BBF which establishes/generates a bearer (in case of a dedicated bearer) or modifies an existing bearer.

For example, the PCC Rule(s) is provided in the Re-Authorization Request (RAR) shown in FIG. 8 and the PCEF answers with the outcome of the installation and the PCEF initiates the bearer procedure so that either a new bearer is established or an existing one between the UE 810 and the PCEF 820 is modified, depending on the received QoS information.

Then, the user is using the service, packets are transmitted and at a certain point in time the user stops using the service. The AF considers that the service is terminated, e.g. because of user inactivity. The AF checks the resource type (if not checked earlier) provided by the PCRF during the AF session establishment.

If the resource type is not provided or the provided value is a default value (case 1), the AF continues with initiating an AF session termination procedure towards the PCRF, see Session Termination Request (STR) and the PCRF will clean all the session information and will answer positively, see Session Termination Response (STA). The PCRF initiates the removal of the PCC Rules related to that AF session, as indicated in the Re-Authorization Request (RAR) and the PCEF responds with the outcome of the operation, e.g. Re-Authorization Response (RAA). Then, the PCEF initiates the bearer procedure and either terminates or modifies one or more bearers in the network.

If the resource type indicates "resources permanently reserved" (case 2), the AF will not take any action, i.e., the PCRF will not be contacted and the further steps explained in case 1, such as initiation of an AF session termination and removal of PCC Rules, are skipped. This is indicated by the dashed box 870 around these steps in FIG. 8.

If the resource type indicates "resources temporarily reserved" (case 3), the AF will activate a timer, as described above. When the timer expires, the AF continues with the steps in box 870 and explained for case 1 previously.

It is noted that it is possible to initiate the release of resources in the AF and still maintain the AF session, e.g. when more than one media is being handled as part of that AF session. In that case, the AF modifies the AF session to release the resources related to one media, and the AF session will be kept.

In the following, the above described steps of FIG. 8 are discussed in more detail.

First, resource type selection in the PCRF is described. When the PCRF receives a request from the AF, it has to select whether the application is subject to resource type control, at least based on one of the AF-application identifier (ID) (the identity of the application or service) and the operator specific policies. If resource type control is required, the PCRF selects the resource type that will be assigned to that service.

In order to do so, the PCRF checks:
 the Bearer Control Mode that has been designed to the user during the IP-CAN session establishment,
 if the Bearer Control Mode indicates UE-initiated bearer establishment, the PCRF checks the operator network deployment, i.e. the support of dedicated bearers initiated by the UE,
 the QCI assigned to the PCC Rules derived for the service.

If the bearer control mode indicates UE_NW, which has been previously described, the PCRF checks whether the QoS assigned to that service requires a GBR QCI, i.e. if a bit rate must be guaranteed for that service for resource allocation and admission control purposes, or not.
 When GBR QCI is assigned, the PCRF allows the AF to release the resources whenever the application requires so. The resource type assigned in this case is "default" (see first line of the table above).
 When non-GBR QCI is assigned and based on operator policies, the PCRF can indicate the AF "resources permanently reserved" (second line of table).

If the bearer control mode indicates UE-only, the PCRF checks whether the network deployment supports dedicated bearers being initiated by the UE.
 If the dedicated bearers are not supported, the PCRF installs the PCC Rules in the default bearer. In order to provide a service usage control on the services running on the default bearer, the PCRF indicates the AF "resources temporarily reserved" (third line of table). Optionally, the PCRF provides a timer indicating the time that the application will wait once the service is considered as terminated before contacting the PCRF.
 If the dedicated bearers are supported, the PCRF allows the AF to release the resources whenever the application requires so. The resource type assigned in this case is "default".

In this case, the UE controls the establishment of dedicated bearers and thus the resources.

Next, resource type handling in the AF is described in more detail. When the AF receives an indication of the resource type assigned to the service it behaves as follows:
 when the resource type indicates "default", the AF acts conventionally, i.e. it interacts with the PCRF based on the application specific demands.

When the resource type indicates "resources permanently reserved", the AF does not contact the PCRF anymore to release or further reserve resources associated to that service.

When the resource type indicates "resources temporarily reserved" and the AF detects that the resources are not required anymore, it initiates the timer related to that service. When the timer expires, the AF interacts with a PCRF to release the resources.

Next, timer handling in the AF is described in more detail. The resource type "resources temporarily reserved" requires that the resources are released by the AF after a period of time. This period refers to the acceptable time since the application detects that the service session has finished until the application detects that the service session is re-established.

The timer can be configured in the AF or provided by the PCRF together with a resource type set to "resources temporarily reserved". The timer provided by the PCRF may be dependent on the application type.

The behaviour in the AF is described in the following. When the AF receives a resource type that indicates "resources temporarily reserved", it checks whether there is an associated timer being provided by the PCRF. If not, it applies its own timer.

The AF starts monitoring the use of the service. When the AF detects that the service is terminated, the timer is initiated. When the timer expires, the PCRF is contacted in order to release the resources. If, during the lifetime of the timer, the AF detects that the same service is being used by the user, the timer is reset. The PCRF is not contacted in this case.

According to the above, signalling between the PCRF and the AF or TDF, for which basically the same description applies as discussed with respect to the AF, is optimized, as well as the signalling between the PCRF and the PCEF. Further, bearers, particularly the ones that do not consume resources, can be maintained for a longer time. Further, continuous initiation of the applicable procedures in core and radio network for the establishment or termination of bearers upon frequent initiation or termination of user applications can be avoided. Therefore, user perception is improved avoiding removing or establishment of bearers upon application demand.

The physical entities according to the different embodiments of the invention, including the elements, nodes and systems may comprise or store computer programs including instructions such that, when computer programs are executed on the physical entities, steps and operations according to the embodiments of the invention are carried out, i.e. cause data processing means to carry out the operations. In particular, embodiments of the invention also relate to computer programs for carrying out the operations/steps according to the embodiments of the invention, and to any computer readable medium storing the computer programs for carrying out the above mentioned methods. A compute readable medium may be any disk or hard disk, RAM or ROM or EEPROM or an intangible medium such as a signal.

Where the terms request obtainer, determiner, resource type sender, request sender, resource type receiver, and decider are used, no restriction is made regarding how distributed these elements may be and regarding how gathered these elements may be. That is, the constituent elements of the nodes and system may be distributed in different software and hardware components or other devices for bringing about the intended functions. A plurality of distinct elements may also be gathered for providing the intended functionalities. For example, elements/functions of the node may be realized by a microprocessor and a memory, wherein the microprocessor may be programmed such that the above mentioned operations or steps, which may be stored as instructions in a memory connected to the microprocessor, are carried out.

Further, the elements of the nodes or system may be implemented in hardware, software, field programmable gate arrays (FPGAs), application specific integrated circuits (ASICs), firmware or the like.

It will be apparent to those skilled in the art that various modifications and variations can be made in the entities and methods of this invention as well as in the construction of this invention without departing from the scope or spirit of the invention.

The invention has been described in relation to particular embodiments and examples which are intended in all aspects to be illustrative rather than restrictive. Those skilled in the art will appreciate that many different combinations of hardware, software and/or firmware will be suitable for practising the present invention.

Moreover, other implementations of the invention will be apparent to those skilled in the art from consideration of the specification and practice of the invention disclosed herein. It is intended that the specification and the examples be considered as exemplary only, wherein abbreviations used in the above examples are listed below. To this end, it is to be understood that inventive aspects lie in less than all features of a single foregoing disclosed implementation or configuration. Thus, the true scope and spirit of the invention is indicated by the following claims.

The invention claimed is:

1. A method for controlling resources in a communication network for a service session between a user equipment (UE) and an application server, by a policy and charging system (PCRF) in the communication network, the method comprising:
   obtaining a request from an application function (AF) of said application server or from a traffic detection function (TDF) of said communication network, the request including service session data indicating the type of a service for the service session between the UE and the application server;
   determining, based on the service session data obtained at said PCRF, a resource type to be assigned to said service; and
   sending to said AF or TDF an indication of said resource type assigned to said service, according to which resource type said AF or TDF determines when the service session is terminated,
   wherein said resource type indicates that resources are temporarily reserved for said service or said resource type indicates that resources are permanently reserved for said service resource type,
   wherein if the resource type indicates that resources are permanently reserved, the resource type indicates that said AF or TDF is to activate a termination timer that is longer than a timer that is to be activated if the resource type indicates that resources are temporarily reserved.

2. The method of claim 1, wherein determining the resource type comprises determining whether the communication network or a user terminal or both support, of a plurality of bearers, a dedicated bearer that is a bearer dedicated to said service.

3. The method of claim 1, further comprising:
sending, from said AF or TDF, the request including said service session data indicating the type of service to said PCRF;
receiving from said PCRF the indication of a resource type determined based on said service session data and assigned to said service; and
deciding when to terminate a service session associated with said service based on said received resource type.

4. The method of claim 1, wherein if the resource type indicates that resources are permanently reserved, said AF or TDF will not take any action.

5. The method of claim 1, wherein if the resource type indicates that resources are temporarily reserved, s said AF or TDF will activate a timer.

6. The method of claim 5, wherein said AF or TDF initiates a service session termination when said timer expires.

7. The method of claim 1, wherein the resource type implies the generation of a non-guaranteed bit rate bearer or guaranteed bit rate bearer.

8. The method of claim 1, wherein said TDF performs packet inspection and service classification.

9. A method for controlling resources in a communication network for a service session between a user equipment (UE) and an application server, the method comprising:
sending, from an application function (AF) of said application server or from a traffic detection function (TDF) of said communication network, a request including service session data indicating, to a policy and charging system (PCRF), the type of service for the service session between the UE and the application server;
receiving from said PCRF an indication of a resource type determined based on said service session data and assigned to said service; and
deciding when to terminate the service session based on said received resource type,
wherein said resource type indicates that resources are temporarily reserved or said service or said resource type indicates that resources are permanently reserved for said service resource type,
wherein if the resource type indicates that resources are permanently reserved, the resource type indicates that said AF or TDF is to activate a termination timer that is longer than a timer that is to be activated it the resource type indicates that resources are temporarily reserved.

10. The method of claim 9, further comprising said AF or TDF taking no further action in response to the indication, in response to determining that the resource type indicates that resources are permanently reserved.

11. The method of claim 9, further comprising said AF or TDF activating a timer, in response to determining that the resource type indicates that resources are temporarily reserved.

12. The method of claim 11, further comprising said AF or TDF initiating a service session termination when said timer expires.

13. The method of claim 9, wherein the resource type implies the generation of a non-guaranteed bit rate bearer or guaranteed bit rate bearer.

14. The method of claim 9, wherein said TDF performs packet inspection and service classification.

15. A non-transitory computer-readable medium comprising, stored thereupon, a computer program, the computer program including instructions configured so as to cause, when executed on a data processor, the data processor to execute the method of claim 1.

16. A non-transitory computer-readable medium comprising, stored thereupon, a computer program, the computer program including instructions configured so as to cause, when executed on a data processor, the data processor to execute the method of claim 9.

* * * * *